March 11, 1969   C. E. ARNOLD   3,432,852
TRANSPONDER HAVING IMPROVED ISOLATION
Filed June 19, 1967   Sheet 1 of 2

INVENTOR.
CHARLES E. ARNOLD

BY *Stanley M. Schurgin*
ATTORNEY.

INVENTOR.
CHARLES E. ARNOLD

BY *Stanley M. Schurgin*
ATTORNEY.

United States Patent Office 3,432,852
Patented Mar. 11, 1969

3,432,852
TRANSPONDER HAVING IMPROVED ISOLATION
Charles E. Arnold, Milton, Mass., assignor to Sylvania Electric Products Inc., a corporation of Delaware
Filed June 19, 1967, Ser. No. 647,048
U.S. Cl. 343—6.5
Int. Cl. G01s 9/56
4 Claims

ABSTRACT OF THE DISCLOSURE

A passive transponder having improved isolation between transmitter and receiver. A group of high-Q circuits arranged in a coded format is interrogated by a transmitter output signal swept through the frequency range of the high-Q circuits causing sequential and delayed reradiation of the transmitted energy. The reradiation is received by a receiver, including a plurality of tuned gates connected to a plurality of tuned detectors, wherein the tuned gate for each particular frequency is energized and allows the delayed signal from the corresponding high-Q circuit to be processed only after the transmitter has swept by the passband of the corresponding tuned detector.

Background of the invention

This invention relates to passive transponder systems and particularly to apparatus for achieving transmitter/receiver isolation in such systems.

In electromagnetic systems used for example for vehicle identification, a passive transponder is mounted on an object to be identified and is operative to reradiate energy transmitted to the object from a remote source. One such system is described in U.S. Patent No. 3,169,242. Problems arise in such systems where the object to be identified passes in close proximity to the transmitting source since the return signal from the transponder arrives at the remote receiver while the transmitter is still radiating. The result is that the return signal must be of sufficient magnitude to overcome the clutter caused by coupling of transmitter energy directly into the receiver or else the receiver is unable to detect the return signal.

By judicious placement of the receiving antenna such that it overlaps the transmitting antenna to cause the electromagnetic flux from the transmitting antenna to link the receiving antenna partly in one direction and partly in the opposite direction, the receiver can be partially isolated from the transmitter. For practical reasons, such as the difficulty in aligning the antennas, nonuniformity in dielectrics separating the antenna, and broad frequency requirements, complete elimination of the transmitter signal in the receiver is impossible. It would be advantageous to have and it is an object of this invention to provide a means for reducing the effect of transmitter leakage into the receiver in systems employing passive transponders.

Summary of the invention

Briefly, the invention employs a plurality of high-Q elements mounted on an object to be identified and operative to receive, delay, and reradiate energy emanating from a remote station. A receiver located at the remote station includes a plurality of tuned gates each connected to a tuned detector wherein each gate is operative only after the transmitter signal frequency has swept through the passband of the associated tuned detector. Thus, each tuned detector is blocked when the transmitted frequency is within the passband of that tuned detector and opened only to receive the delayed energy from the high-Q element of the same frequency.

Brief description of the drawings

The invention will be more fully understood from the following detailed description taken in conjunction with the accompanying drawings in which.

Detailed description of the invention

Figure 1:
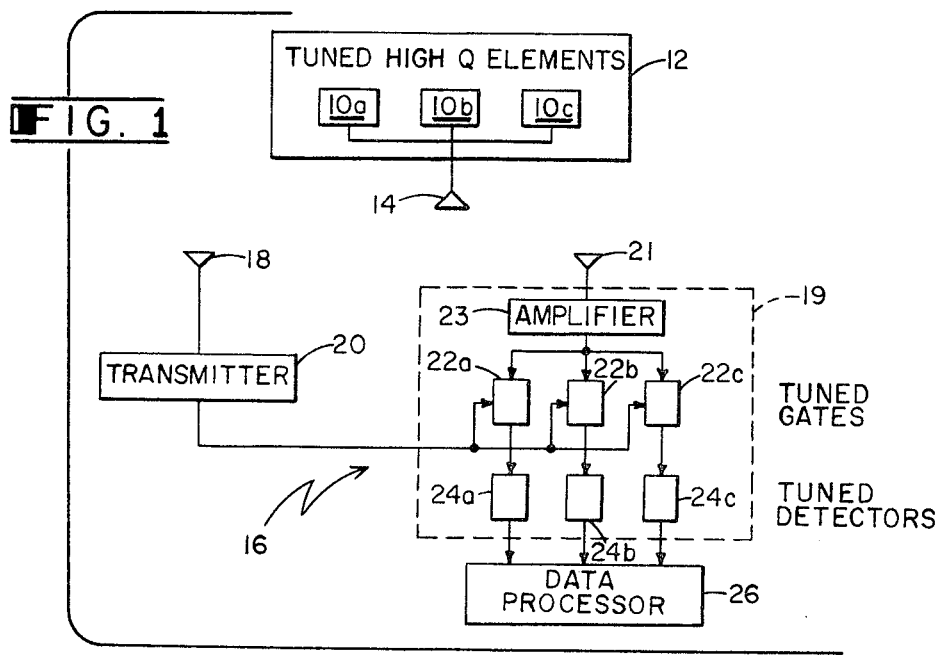
FIG. 1 is a block diagram of a preferred embodiment of the invention.

Referring to FIG. 1, the passive transponder is located on an object 12 to be identified, and includes a plurality of tuned high-Q elements 10a–10c coupled to an antenna 14. The high-Q elements are each tuned to a separate discrete frequency, the combination of frequencies representing the identity of object 12. This transponder is energized from an interrogation station 16 having a transmitter 20, transmitting antenna 18, receiver 19 and receiving antenna 21. Transmitting 20 generates a swept frequency signal traversing the frequency range of high-Q elements 10a–10c. Receiver 19 includes an amplifier 23 connected to a plurality of tuned gates 22a–22c, one tuned gate being provided for each of the high-Q elements, which, in turn, are connected to a respective plurality of tuned detectors 24a–24c. The outputs of the detectors are connected to a data processor 26 operative to decode the data content of a received signal. Transmitter 20 is coupled to each of the tuned gates which are operative to open and close in response to the frequency of the transmitter signal.

In operation, transmitter 20 provides a swept frequency signal which is radiated by antenna 18 and received by antenna 14. The high-Q elements 10a–10c respond to the frequency to which they are tuned and sequentially reradiate a delayed version of certain frequency components of the received energy. The reradiated signal is sensed by receiving antenna 21, amplified by amplifier 23 and directed through the appropriate tuned gates and tuned detectors to data processors 26 where the signal is decoded.

The tuned gates 22a–22c are sequentially opened and closed in response to the frequency of the transmitter signal such that each gate passes its corresponding signal only after the transmitter frequency has swept beyond the passband of the corresponding tuned detector. In this manner, the tuned detectors are immune to energy coupled from the transmitter to the receiver since each detector is blocked when the transmitter signal frequency is within the passband of that detector. For example tuned gate 22a opens when the transmitter signal frequency has swept beyond the passband of tuned detector 24a, thereby blocking the transmitter energy which could feed through the receiver, but permitting the delayed signal from element 10a to be directed to data processor 26.

Figure 2:
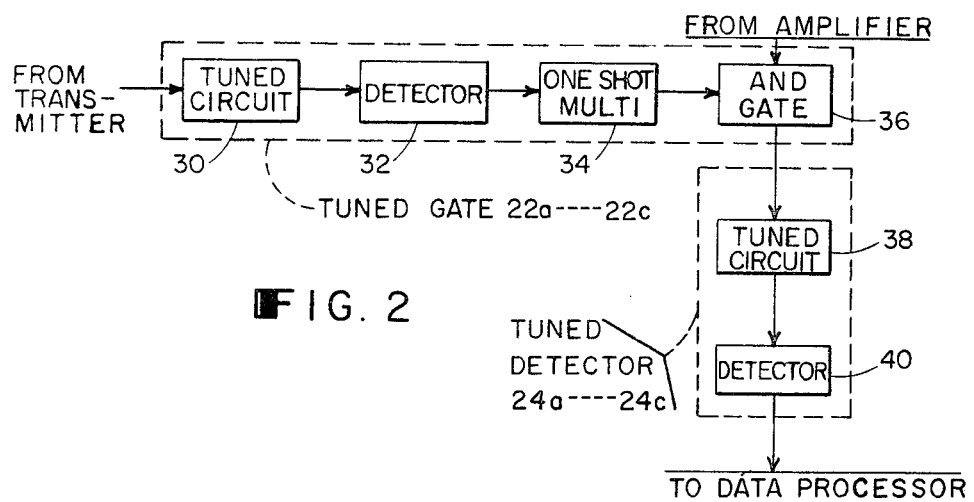
FIG. 2 is a block diagram of the tuned gates and tuned detectors of FIG. 1.

The tuned gate and tuned detector are shown in greater detail in FIG. 2. The tuned gate employs a series combination of a tuned circuit 30, typically a tank circuit, a detector 32, for example, a crystal detector, and a one shot multivibrator 34, and an AND gate 36. The tuned detector employs a series combination of a tuned circuit 38, such as a tank circuit, and a detector 40, typically a crystal detector. In operation, as the transmitter signal sweeps through the passband of tuned circuit 30, it is detected by detector 32 which triggers multivibrator 34. The output signal from multivibrator 34 is one of two input signals supplied to AND gate 36. The second input signal is the delayed received signal from the transponder which is directed through amplifier 23 to the AND gate. Upon coincidence of the two signals, the received energy is directed through AND gate 36 to tuned circuit 38 and detector 40 prior to transmission to the data processor. The passband of tuned circuit 30 is outside the passband of the tuned detector and generally is adjacent to the passband of tuned circuit 38 in the frequency spectrum in the direction in which the transmitter is sweeping. For example, when the transmitter signal sweeps through the frequency of tuned detector 38, no energy is received by the tuned detector since AND gate 36 has only one signal present, that being direct energy from the amplifier 23. After the transmitter signal has swept beyond the passband of tuned circuit 38, it reaches the passband of tuned circuit 30 wherein a signal is generated to open gate 36 and direct the delayed received signal from the transponder to the tuned circuit 38 and thence to data processor 26. Thus, the received signal is applied to the data processor for decoding only after the transmitter signal is beyond the passband of the particular tuned detector. The receiver is, therefore, immune to energy which may be coupled thereto from the transmitter.

Figure 3A:
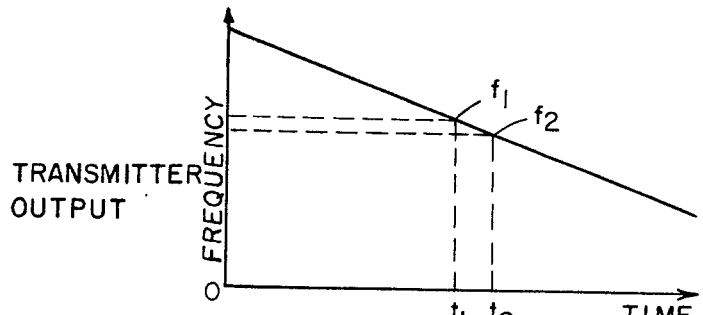
FIGS. 3A–3E are waveforms useful in explaining the operation of FIG. 1.
Figure 3B:
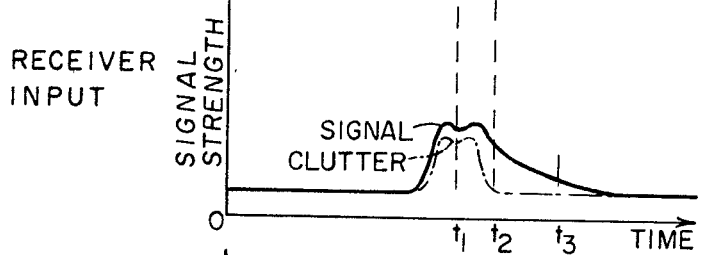
Figure 3C:
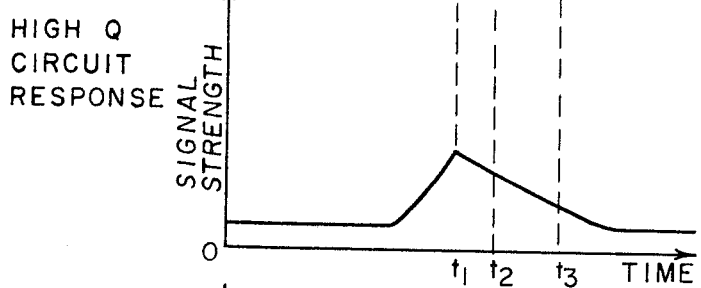
Figure 3D:
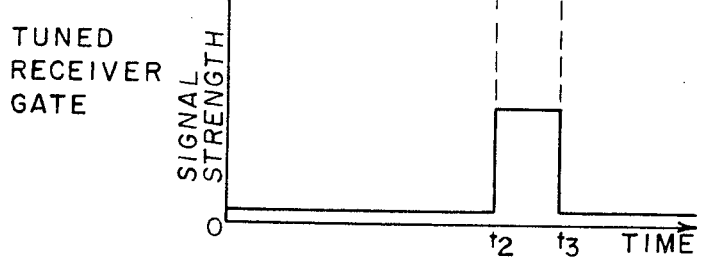
Figure 3E:
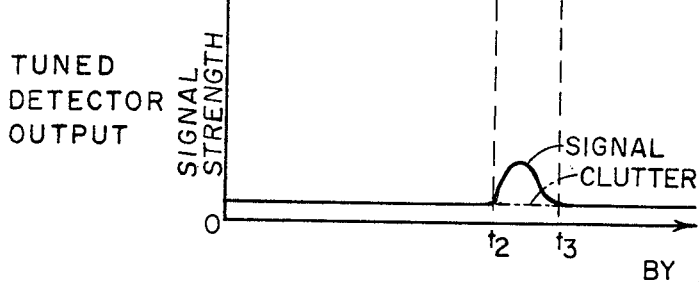

To more fully explain the instant invention the waveforms of FIGS. 3A–3E will be discussed in conjunction with the block diagram of FIG. 1. Transmitter 20 has a frequency output versus time as shown in FIG. 3A. Assume at $t_1$ the transmitter is radiating frequency $f_1$ corresponding to the resonant frequency of high-Q circuit 10a. At the input to receiver 19 (FIG. 3B) there is a signal comprised of the reradiated energy from 10a plus the clutter caused not only by leakage of the transmitted energy directly into the receiver but also from energy reflected from surrounding objects. The output signal of the high-Q circuit, shown in FIG. 3C, is combined with the clutter signal of FIG. 3B to form the composite signal at the receiver. It is noted that the peak output signal of the high-Q circuit and the peak clutter signal occur simultaneously resulting in a low signal-to-clutter ratio. When the transmitter has progressed to $t_2$ (FIG. 3A), the clutter drops to zero because the transmitter output signal is no longer in the passband of the tuned detector 24a. At the instant $f_2$ is reached, tuned receiver gate 22a is opened from time $t_2$ to $t_3$ as shown in FIG. 3D. Between times $t_2$ and $t_3$ the high-Q circuit 10a is still radiating the stored energy albeit at a level less than peak at the center frequency of the tuned detector 24a. The output signal of the tuned detector 24a, shown in FIG. 3E, is composed primarily of the desired signal and very little clutter thereby providing an enhanced signal-to-clutter ratio.

The sweep rate of the transmitter must be sufficiently high to traverse the frequency range of all the high-Q elements while the object is within the range of the interrogation station, and also to traverse the passband of the tuned detector before the delayed signal from the high-Q element has decreased to zero. Thus, there must be a proper interrelationship between the speed of the object, the Q of the transponder elements, the tuned detector bandwidth, and the required sweep rate of the transmitter. Typically for an object travelling at 60 m.p.h. and carry 40 high-Q elements equally spaced in frequency 10 kc. apart, the sweep rate of the transmitter would be 3500 kc. With a typical Q of 100, the decay time constant of each element of the transponder would be 2 milliseconds which is sufficient considering the transmitter signal passes through each detector bandwidth, 10 kc., in .35 millisecond.

In summary, the instant invention, by the use of high-Q passive transponders, delays the return signal from an object to be identified until the transmitter energy is either turned off or is transferred to another frequency outside the passband of a tuned detector, achieves receiver/transmitter isolation and enhances the signal-to-clutter ratio. Although a preferred embodiment of the invention has been shown and described herein, the invention is not to be limited by what has been particularly shown and described except as indicated in the appended claims.

What is claimed is:

1. In a system employing a passive transponder adapted to receive a multi-frequency signal from a transmitter and reradiate a signal to a receiver, apparatus comprising:
   transmitter means operative to radiate a swept multifrequency excitation signal;
   transponder means operative to receive, delay and reradiate selected frequency components of said excitation signal; and
   receiver means operative to detect said reradiated signal and including:
      gating means operative in response to said transmitter means to pass a frequency component of said reradiated signal only after said swept excitation signal has swept through said frequency component.

2. The invention according to claim 1 wherein said transponder means includes a plurality of high-Q elements each tuned to a discrete frequency and operative to delay and reradiate respective frequency components of said excitation signal.

3. In an identification interrogation system having a passive transponder associated with an object to be identified and having a transmitter means and a receiver means associated with an interrogation station, apparatus comprising:
   a plurality of high-Q elements mounted on said object and operative to receive, delay and reradiate discrete frequencies of an excitation signal from said transmitter means;
   a plurality of tuned detectors each operative in response to corresponding ones of said discrete frequency signals to provide an output signal; and
   a plurality of gates each operative to sense the frequency of said excitation signal and to direct a discrete frequency signal to a respective tuned detector when the frequency of said excitation signal is outside the passband of said detector.

4. The apparatus according to claim 1 wherein said gating means comprises:
   a tuned circuit operative to pass a first discrete frequency of said swept multifrequency excitation signal from said transmitter means;
   a detector means operative in response to the signal passed by said tuned circuit to generate a trigger signal;
   a one-shot multivibrator operative in response to the trigger signal from said detector means to generate a first gating pulse; and
   a gate operative in response to the first gating pulse from said one-shot multivibrator to pass a frequency component of said reradiated signal not within the passband of said tuned circuit.

References Cited

UNITED STATES PATENTS

| | | | |
|---|---|---|---|
| 3,022,492 | 2/1962 | Kleist et al. | 343—6.5 |
| 3,137,847 | 6/1964 | Kleist | 343—6.5 |
| 3,145,380 | 8/1964 | Currie | 343—6.5 |
| 3,169,242 | 2/1965 | Davis et al. | 343—6.5 |

RODNEY D. BENNETT, *Primary Examiner.*

M. F. HUBLER, *Assistant Examiner.*